(12) United States Patent
Samyn et al.

(10) Patent No.: US 11,007,900 B2
(45) Date of Patent: May 18, 2021

(54) BATTERY THERMAL MANAGEMENT ASSEMBLY AND METHOD

(71) Applicant: Ford Global Technologies, LLC, Dearborn, MI (US)

(72) Inventors: Andrew Charles Samyn, Dearborn, MI (US); Stephen Pien, Farmington Hills, MI (US); Erik Billimoria, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 16/124,347

(22) Filed: Sep. 7, 2018

(65) Prior Publication Data

US 2020/0079225 A1    Mar. 12, 2020

(51) Int. Cl.
| | |
|---|---|
| *B60L 58/26* | (2019.01) |
| *B60K 6/28* | (2007.10) |
| *B60K 1/04* | (2019.01) |
| *B62D 33/02* | (2006.01) |
| *H01M 10/613* | (2014.01) |
| *H01M 10/625* | (2014.01) |
| *H01M 10/6568* | (2014.01) |
| *B60K 1/00* | (2006.01) |

(52) U.S. Cl.
CPC .............. *B60L 58/26* (2019.02); *B60K 1/04* (2013.01); *B60K 6/28* (2013.01); *B62D 33/02* (2013.01); *H01M 10/613* (2015.04); *H01M 10/625* (2015.04); *H01M 10/6568* (2015.04); *B60K 2001/005* (2013.01); *B60K 2001/0438* (2013.01); *B60Y 2200/91* (2013.01); *B60Y 2200/92* (2013.01); *B60Y 2306/05* (2013.01); *H01M 2220/20* (2013.01)

(58) Field of Classification Search
CPC ... B60L 58/26; B60K 6/28; B60K 2001/0438; H01M 10/625; H01M 10/613; H01M 10/6568; H01M 2220/20; B60Y 2306/05; B60Y 2200/92
See application file for complete search history.

(56) References Cited

U.S. PATENT DOCUMENTS

| | | |
|---|---|---|
| 5,848,744 A | 12/1998 | Dischner et al. |
| 6,629,714 B2 | 10/2003 | Campbell |
| (Continued) | | |

FOREIGN PATENT DOCUMENTS

| | | |
|---|---|---|
| JP | 08150826 | 6/1996 |

*Primary Examiner* — Kun Kai Ma
(74) *Attorney, Agent, or Firm* — David Kelley, Esq.; Carlson, Gaskey & Olds, P.C.

(57) ABSTRACT

An exemplary vehicle assembly vehicle assembly includes, among other things, a heat exchange module that manages thermal energy levels of a traction battery. An inlet conduit is configured to draw air to the heat exchange module from an area underneath a vehicle. An outlet conduit is configured to dispense air from the heat exchange module to the area underneath the vehicle. An exemplary thermal management method includes, among other things, to manage thermal energy within a traction battery of a vehicle, exchanging thermal energy between a fluid and air at a heat exchange module. The air is drawn to the heat exchange module from an area underneath the vehicle. The air is dispensed from the heat exchange module to the area underneath the vehicle.

18 Claims, 3 Drawing Sheets

(56) References Cited

U.S. PATENT DOCUMENTS

| | | | | |
|---|---|---|---|---|
| 6,660,967 | B2* | 12/2003 | Brofft | F02B 63/04 |
| | | | | 219/133 |
| 8,013,567 | B2* | 9/2011 | Windsor | H01M 2/1072 |
| | | | | 320/101 |
| 8,672,067 | B2* | 3/2014 | Ajisaka | B60R 19/34 |
| | | | | 180/65.21 |
| 2003/0013405 | A1* | 1/2003 | Guilford, Sr. | B60H 1/00428 |
| | | | | 454/165 |
| 2008/0139102 | A1* | 6/2008 | Major | B60L 1/003 |
| | | | | 454/139 |
| 2015/0340745 | A1* | 11/2015 | Inoue | H01M 10/6563 |
| | | | | 429/120 |
| 2017/0267120 | A1* | 9/2017 | Takizawa | B60K 1/04 |

\* cited by examiner

BATTERY THERMAL MANAGEMENT ASSEMBLY AND METHOD

TECHNICAL FIELD

This disclosure relates generally to an assembly that manages thermal energy levels of a traction battery and, more particularly, to packaging portions of the assembly.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Traction batteries of electrified vehicles typically include a plurality of arrays each having individual battery cells that are periodically recharged to replenish the energy necessary to power the electric machines. Battery cells can heat up during charging and discharging, and during other stages of operation. Operating the battery cells at certain temperatures can improve the capacity and the life of the battery cells. Managing thermal energy levels of the traction battery can facilitate efficient operation.

SUMMARY

A vehicle assembly according to an exemplary aspect of the present disclosure includes, among other things, a heat exchange module that manages thermal energy levels of a traction battery. An inlet conduit is configured to draw air to the heat exchange module from an area underneath a vehicle. An outlet conduit is configured to dispense air from the heat exchange module to the area underneath the vehicle.

In another non-limiting embodiment of the foregoing assembly, the heat exchange module is a liquid-to-air heat exchange module.

Another non-limiting embodiment of any of the foregoing assemblies includes a fan that communicates a flow of the air through the heat exchange module. The fan is disposed within the heat exchange module.

Another non-limiting embodiment of any of the foregoing assemblies includes a pump that moves a fluid to the heat exchange module. The pump is disposed outside the heat exchange module.

In another non-limiting embodiment of any of the foregoing assemblies, the heat exchange module is disposed within a cargo bed of the vehicle.

In another non-limiting embodiment of any of the foregoing assemblies, the inlet and outlet conduits each extend downwardly from the heat exchange module, through a floor of the cargo bed, to the area underneath the vehicle.

In another non-limiting embodiment of any of the foregoing assemblies, the heat exchange module vents no air to the cargo bed.

In another non-limiting embodiment of any of the foregoing assemblies, the vehicle is a pickup truck.

In another non-limiting embodiment of any of the foregoing assemblies, the heat exchange module is disposed between a front wall of a cargo bed and a passenger compartment of the vehicle.

In another non-limiting embodiment of any of the foregoing assemblies, the inlet conduit is a first inlet conduit, the outlet conduit is a second outlet conduit. The assembly further includes a second inlet conduit and a second outlet conduit. The first inlet and outlet conduit are configured to communicate air to and from a first cooling condenser of the heat exchange module. The second inlet and outlet conduit are configured to communicate air to and from a second cooling condenser of the heat exchange module.

In another non-limiting embodiment of any of the foregoing assemblies, the inlet conduit opens to an opening that is vertically beneath the heat exchange module, and the outlet conduit opens to an opening that is vertically beneath the heat exchange module.

A thermal management method according to another exemplary aspect of the present disclosure includes, among other things, to manage thermal energy within a traction battery of a vehicle, exchanging thermal energy between a fluid and air at a heat exchange module. The air is drawn to the heat exchange module from an area underneath the vehicle. The air is dispensed from the heat exchange module to the area underneath the vehicle.

Another example of the foregoing method includes heating the fluid with thermal energy from the traction battery, and cooling the fluid at the heat exchange module using the air.

In another example of any of the foregoing methods, the fluid is liquid.

Another example of any of the foregoing methods includes moving the air through the heat exchange module using a fan that is disposed within the heat exchange module.

Another example of any of the foregoing methods includes moving the fluid through the heat exchange module using a pump that is disposed outside the heat exchange module.

In another example of any of the foregoing methods, the heat exchange module is disposed within a cargo bed and the area is underneath a floor of the cargo bed.

In another example of any of the foregoing methods, the heat exchange module is disposed between a front wall of a cargo bed and a passenger compartment of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a thermal management assembly for an electrified vehicle. The thermal management assembly includes a heat exchange module having inlet and outlet conduits that open to areas underneath the electrified vehicle. These and other features of this disclosure are described in greater detail in the following paragraphs of this detailed description.

Figure 1:
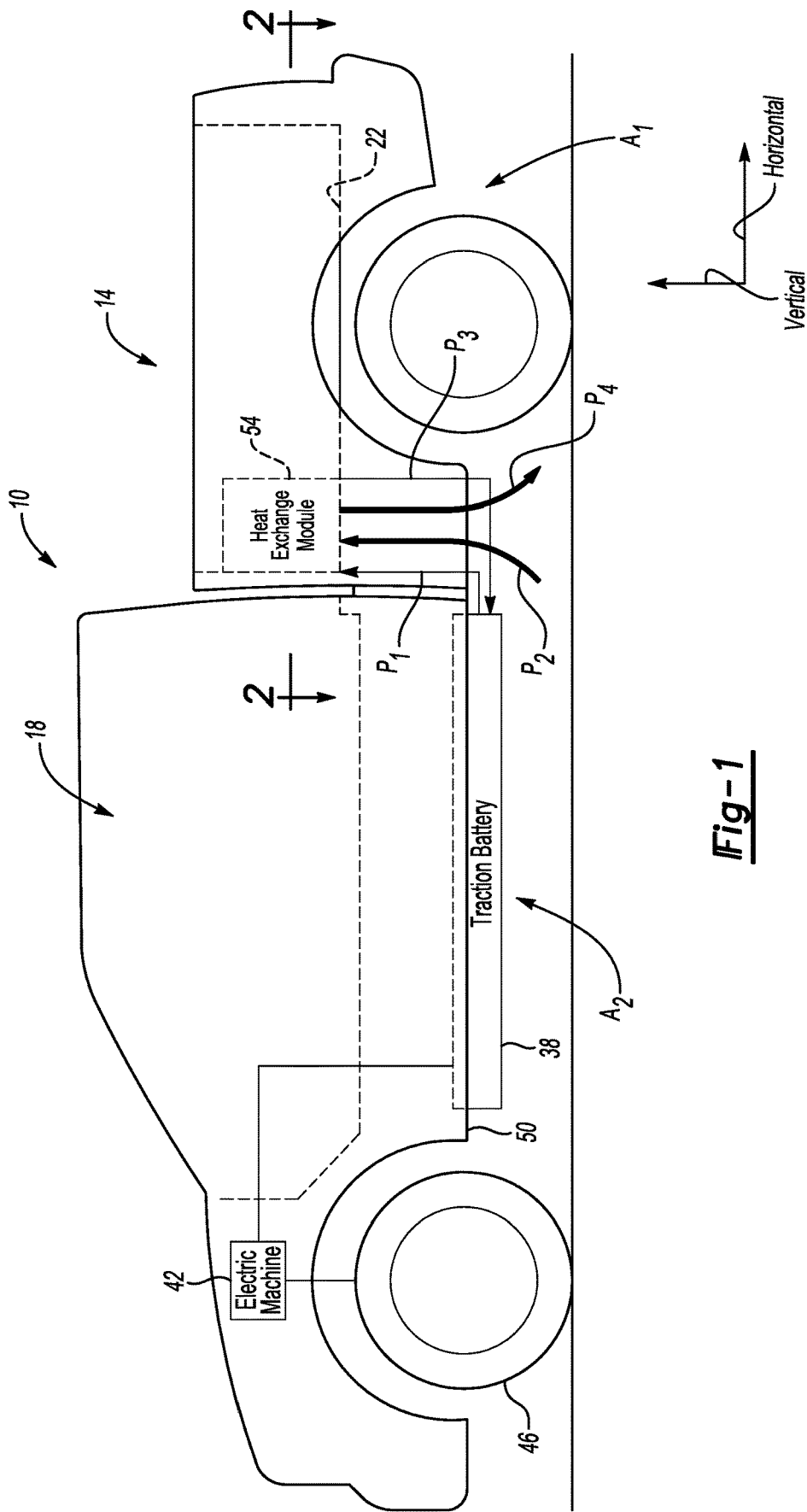
FIG. 1 illustrates a schematic side view of an electrified vehicle equipped with a cargo bed for storing and hauling cargo.

FIG. 1 schematically illustrates a vehicle 10 including a cargo bed 14. In the illustrated embodiment, the vehicle 10 is a pickup truck. While a truck is pictured, vehicles other than trucks could also benefit from the teachings of this disclosure.

The cargo bed 14 establishes a cargo space for storing and hauling cargo with the vehicle 10. The example cargo bed 14 is rearward of a passenger cabin 18 of the vehicle 10.

Figure 2:
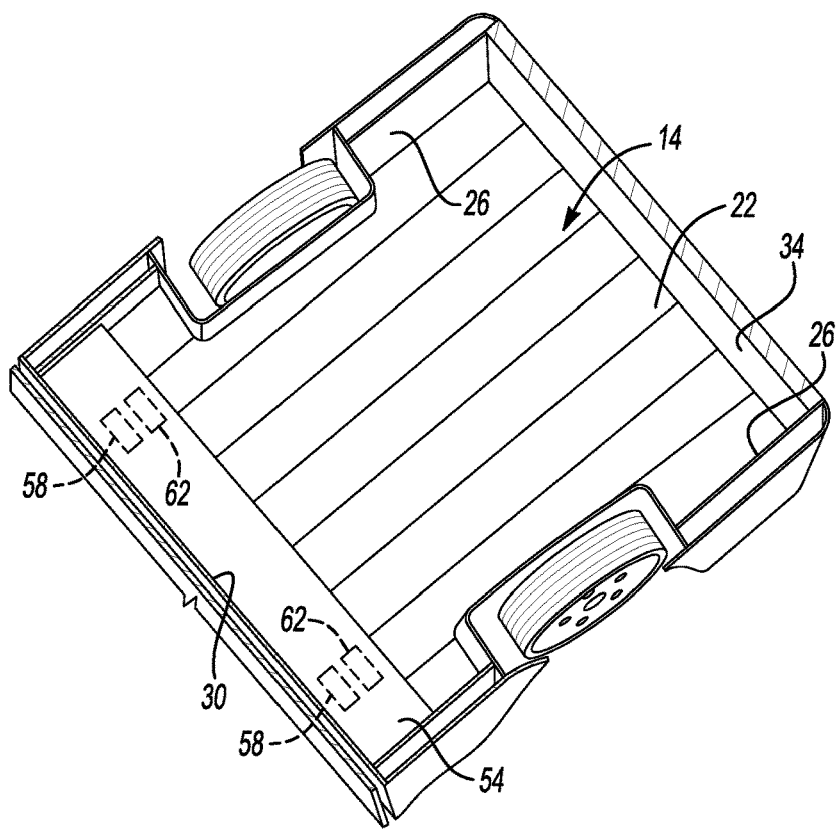
FIG. 2 illustrates a section taken at line 2-2 in FIG. 1.

With reference now to FIG. 2 and continued reference to FIG. 1, the cargo bed 14 includes a floor 22 extending between a pair of longitudinally extending sidewalls 26. A front of the cargo bed 14 is provided by a front wall 30 that is aft the passenger cabin 18. A rear of the cargo bed 14 is provided by a tailgate 34.

The vehicle 10 further includes a traction battery 38, at least one electric machine 42, and a plurality of drive wheels 46. When powered, the electric machine 42 can drive the drive wheels 46 to move the vehicle 10. The electric machine 42 can receive electric power from the traction battery 38. The electric machine 42 converts the electric power to torque to drive the drive wheels 46. The example traction battery 38 is considered a relatively high-voltage battery.

The example vehicle 10 is an all-electric vehicle. In other examples, the vehicle 10 is a hybrid electric vehicle, which selectively drives wheels using torque provided by an internal combustion engine instead of, or in addition to, the electric machine. Generally, the vehicle 10 can be any type of vehicle having a traction battery.

The vehicle 10 includes an underbody structure 50, which faces vertically downward. The traction battery 38 is mounted to the underbody structure 50 in a position vertically below the passenger cabin 18 and, in this example, vertically below the cargo bed 14.

The vehicle 10 also includes horizontally facing sides and a downwardly facing side. Vertical and horizontal, for purposes of this disclosure, refer to the general orientation of the vehicle 10 with respect to ground during ordinary operation of the vehicle 10.

Many areas are underneath the vehicle 10. In the exemplary embodiment, area $A_1$ is underneath the vehicle 10 because the area $A_1$ is vertically below the floor 22 of the cargo bed 14. Area $A_2$ is also underneath this vehicle 10. Area $A_2$ is underneath the vehicle 10 because area $A_2$ is vertically below the traction battery 38.

The vehicle 10 includes a thermal management assembly that is used to, among other things, manage thermal energy levels of the traction battery 38. Managing thermal energy levels can facilitate efficient operation of the traction battery 38. One component of the thermal management assembly is a heat exchange module 54.

Figure 3:
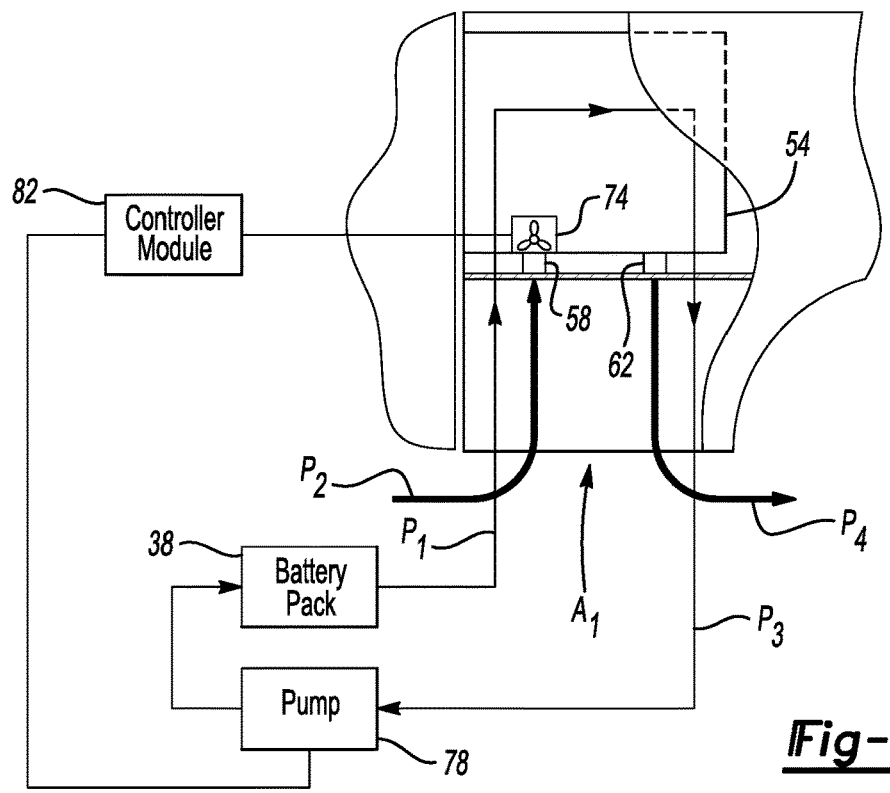
FIG. 3 illustrates a close-up view of an area of the vehicle of FIG. 1 with selected portions cut away to show a heat exchange module disposed within the cargo bed.

Referring now to FIG. 3, with continued reference to FIGS. 1 and 2, a fluid moves from the traction battery 38 to the heat exchange module 54 along a path $P_1$. The fluid moved along the path $P_1$ can be a liquid coolant that, prior to moving along the path $P_1$ is circulated through the traction battery 38 where the fluid is heated with thermal energy from the traction battery 38. Air moves to the heat exchange module 54 along a path $P_2$.

Within the heat exchange module 54, thermal energy is exchanged between the fluid and the air. In this example, the fluid is water. The heat exchange module 54 is thus a liquid-to-air heat exchange module.

Generally, the heat exchange module 54 refers to module of the thermal management assembly where thermal energy is exchanged between the fluid and the air. The exchange could include thermal energy passing from the fluid to the air, which cools the fluid. The exchange could include thermal energy passing from the air to the fluid, which cools the air.

In this example, the fluid is cooled by the air within the heat exchange module 54. The heat exchange module 54 could include a bundle of tubes for communicating the fluid through the heat exchange module 54. The air, which is the flow of air in this example, is passed over the bundle of tubes. Within the heat exchange module 54, thermal energy from the fluid communicating through the bundle of tubes passes from the fluid to the air.

The fluid, which has been cooled at the heat exchange module 54, can then move back to the traction battery 38 along path $P_3$. The air, which has been heated at the heat exchange module 54 by the fluid, exits the heat exchange module 54 along path $P_4$.

For purposes of this disclosure, the heat exchange module 54 is described as being used to manage thermal energy levels of the traction battery 38 of the all-electric vehicle. The vehicle including the traction battery 38 could instead be a hybrid electric vehicle (HEV), a plug-in hybrid electric vehicles (PHEV), or another type of electric vehicle. The heat exchange module 54 could be used to manage thermal energy levels of components other than a traction battery, such as for rear axle cooling. The heat exchange module 54, in such examples, could be used in conventional vehicles that do not include a traction battery.

In the exemplary, non-limiting embodiment, the heat exchange module 54 is disposed at front of the cargo bed 14 adjacent the front wall 30. The heat exchange module 54 includes two cooling condensers within a single, modular package. A separate bundle of tubes is associated with each of the cooling condensers.

Figure 4:
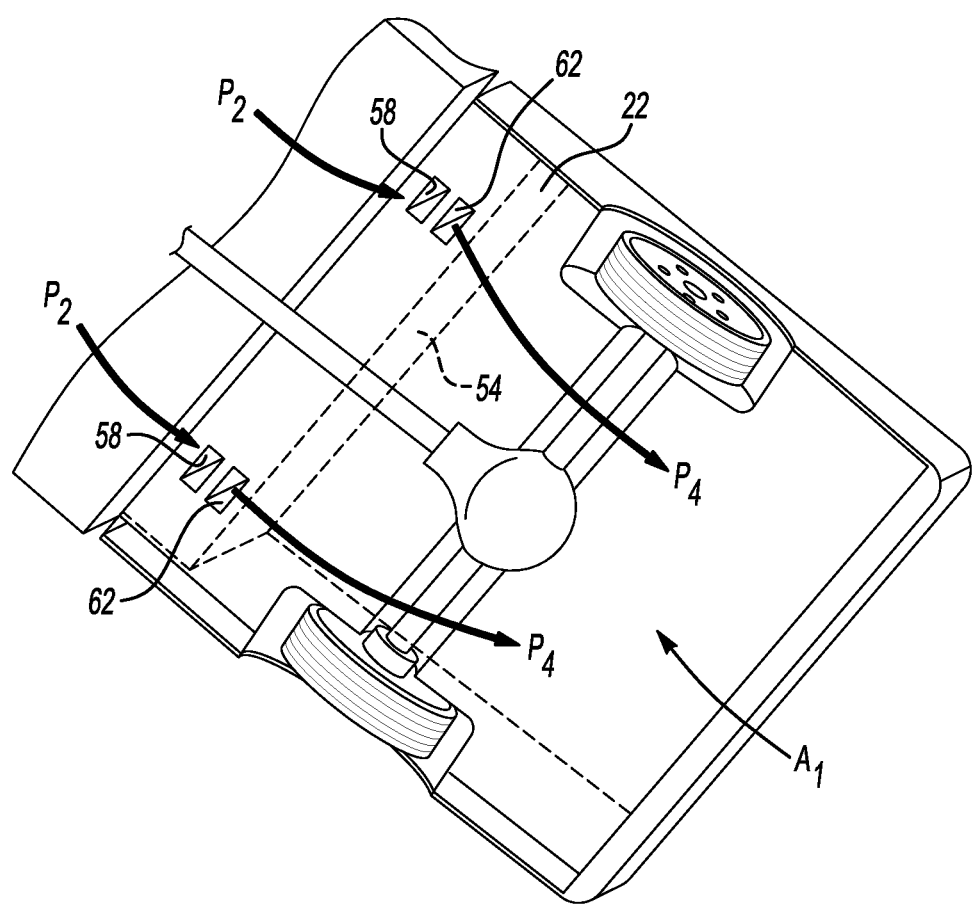
FIG. 4 illustrates an underneath view of the cargo bed of FIG. 1.

FIG. 4 shows an area underneath the floor 22 of the cargo bed 14. As shown, inlet conduits 58 and outlet conduits 62 open to the area underneath the floor 22. In the exemplary embodiment, the inlet conduits 58 and outlet conduits 62 each extend downwardly from the heat exchange module 54, through the floor 22 of the cargo bed 14, to the area underneath the vehicle 10.

The inlet conduits 58 are configured to convey air from the area underneath the floor 22 to the heat exchange module 54. The outlet conduits 62 are configured to convey air from the heat exchange module 54 to the area underneath the floor 22. One of the inlet conduits 58 and one of the outlet conduits 62 convey air to and from one of the cooling condensers. The other of the inlet conduits 58 and the other of the outlet conduits 62 convey air to and from the other one of the cooling condensers.

In this example, the inlet conduits 58 open to respective openings in the floor 22 that are directly beneath the heat exchange module 54. Similarly, the outlet conduits 62 open to respective openings in the floor 22 that are directly beneath the heat exchange module 54.

In another example, one or more of the inlet conduits 58 and the outlet conduits 62 open to openings that are spaced laterally to a side of the heat exchange module 54, spaced aft the heat exchange module 54, or spaced in front of the heat exchange module 54. In these positions, however, the inlet conduits 58 and the outlet conduits 62 still extend through the floor 22 of the cargo bed 14 to the area underneath the vehicle 10.

To move air through the inlet conduits 58 and the outlet conduits 62, the heat exchange module 54 can include at least one fan 74. In this example, the at least one fan 74 is disposed within the heat exchange module 54. The fan 78 could be upstream from where thermal energy is exchanged between the fluid and air. The fan 78, in such an example, is used to push air through the heat exchange module 54. The fan 78 could be downstream from where thermal energy is exchanged between the fluid and the air. The fan 78, in such an example, is used to pull air through the heat exchange module 54. The fan 78 could also include a combination of an upstream fan and a downstream fan.

A pump 78, or pumps, can be used to move the first coolant along the path $P_1$ to the heat exchange module 54 and from the heat exchange module 54 along the path $P_3$. The pump 78 can be packaged outside of the heat exchange module 54 in another area of the vehicle 10.

A controller module 82 can be incorporated within the vehicle 10 to selectively activate the fan 74, the pump 78, or both. The controller module 82 can be a microcontroller unit (MCU). The controller module 82 could include a single controller module, or selected portions of a plurality of different controller modules. The controller module 94 could be, or could include, an engine control unit (ECU) of the vehicle 10.

The controller module 82 can include, among other things, a processor and a memory portion. The processor can be programmed to execute a program stored in the memory portion. The processor can be a custom made or commercially available processor, a central processing unit (CPU), an auxiliary processor among several processors associated with the controller module 82, a semiconductor based microprocessor (in the form of a microchip or chipset) or generally any device for executing software instructions.

The memory portion can include any one or combination of volatile memory elements. Programs can be stored in the memory portion as software code and used to selectively activate the fan 74, the pump 78, or both. The programs can include one or more additional or separate programs, each of which includes an ordered list of executable instructions for implementing logical functions associated with commanding the fan 74 and the pump 78.

In an exemplary non-limiting embodiment, the controller module 82 assesses that cooling the traction battery 38 is desired. The assessment can be based, for example, on a temperature reading from a temperature sensor associated with the traction battery 38. The traction battery 38 can heat up and require cooling when the vehicle 10 is towing a load, for example.

To begin cooling the traction battery 38, the controller module 82 can commands the fan 74 to activate to draw air from beneath the floor 22 through the inlets 58. The controller module 82 can further activate the pump 78 to move fluid to the heat exchange module 54.

In the example embodiment, the heat exchange module 54 is disposed within the cargo bed 14. In another example, the heat exchange module 54 could be positioned between the passenger cabin 18 and the front wall 30 of the vehicle 10.

The inlets conduits 58 to, and outlet conduits 62 from, the heat exchange module 54 open to areas underneath the vehicle 10. This positioning hides openings to the inlet conduits 58 and outlets conduits 62, and ensures that the air, which may be heated after passing through the heat exchange module 54, is not directed into the cargo bed 14.

Features of the exemplary embodiments can include packaging a heat exchange module of a thermal management system within, or adjacent to, a cargo bed and moving air to and from the heat exchange module from an area underneath the vehicle. Another feature is exchanging thermal energy between a fluid and air at a heat exchange module. The air drawn to the heat exchange module from an area underneath the vehicle, the air dispensed from the heat exchange module to the area underneath the vehicle.

Opening an inlet to the heat exchange module and an outlet from the heat exchange module to the area underneath the vehicle lessens the visual impact of the inlet and outlet. Further, heated air is not vented into the cargo bed, which could be objectionable.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a heat exchange module that manages thermal energy levels of a traction battery;
   an inlet conduit configured to draw air to the heat exchange module from an area underneath a vehicle; and
   an outlet conduit configured to dispense air from the heat exchange module to the area underneath the vehicle, the heat exchange module disposed entirely outside the traction battery and spaced a distance from the traction battery such that the air communicates through the heat exchange module without communicating over traction battery,
   wherein the heat exchange module is disposed within a cargo bed of the vehicle.

2. The vehicle assembly of claim 1, wherein the heat exchange module is a liquid-to-air heat exchange module, wherein the liquid is communicated to the heat exchange module from the traction battery, and is communicated from the heat exchange module to the traction battery.

3. The vehicle assembly of claim 1, further comprising a fan that communicates a flow of the air through the heat exchange module, the fan disposed within the heat exchange module.

4. The vehicle assembly of claim 1, further comprising a pump that moves a fluid to the heat exchange module, the pump disposed outside the heat exchange module.

5. The vehicle assembly of claim 1, wherein the inlet and outlet conduits each extend downwardly from the heat exchange module, through a floor of the cargo bed, to the area underneath the vehicle.

6. The vehicle assembly of claim 1, wherein the heat exchange module vents no air to the cargo bed.

7. The vehicle assembly of claim 1, wherein the vehicle is a pickup truck.

8. The vehicle assembly of claim 1,
   wherein the inlet conduit is a first inlet conduit, the outlet conduit is a second outlet conduit, and further comprising a second inlet conduit and a second outlet conduit, the first inlet and outlet conduit configured to communicate air to and from a first cooling condenser of the heat exchange module, the second inlet and outlet conduit configured to communicate air to and from a second cooling condenser of the heat exchange module.

9. The vehicle assembly of claim 1, wherein the inlet conduit opens to an opening that is vertically beneath the heat exchange module and vertically above the traction battery, and the outlet conduit opens to an opening that is vertically beneath the heat exchange module and vertically above the traction battery.

10. The vehicle assembly of claim 1, wherein the heat exchange module is disposed vertically above the battery pack.

11. A thermal management method, comprising:
to manage thermal energy within a traction battery of a vehicle, exchanging thermal energy between a fluid and air at a heat exchange module that is outside the traction battery, the air drawn to the heat exchange module from an area underneath the vehicle, the air dispensed from the heat exchange module to the area underneath the vehicle, the air dispensed from the heat exchange module without any of the air within the heat exchange module passing over any portion of the traction battery, wherein the heat exchange module is disposed between a front wall of a cargo bed and a passenger compartment of the vehicle.

12. The thermal management method of claim 11, further comprising heating the fluid with thermal energy from the traction battery, communicating the fluid outside the traction battery to the heat exchange module, and then cooling the fluid at the heat exchange module using the air.

13. The thermal management method of claim 11, wherein the fluid is liquid.

14. The thermal management method of claim 11, further comprising moving the air through the heat exchange module using a fan that is disposed within the heat exchange module.

15. The thermal management method of claim 11, further comprising moving the fluid through the heat exchange module using a pump that is disposed outside the heat exchange module.

16. The thermal management method of claim 11, wherein the heat exchange module disposed outside the traction battery and spaced a distance from the traction battery, wherein the liquid is communicated to heat exchange module from the traction battery, and is communicated from the heat exchange module to the traction battery.

17. A vehicle assembly, comprising:
a heat exchange module that manages thermal energy levels of a traction battery;
an inlet conduit configured to draw air to the heat exchange module from an area underneath a vehicle; and
an outlet conduit configured to dispense air from the heat exchange module to the area underneath the vehicle, the heat exchange module disposed entirely outside the traction battery and spaced a distance from the traction battery such that the air communicates through the heat exchange module without communicating over traction battery,
wherein the heat exchange module is disposed between a front wall of a cargo bed and a passenger compartment of the vehicle.

18. A thermal management method, comprising:
to manage thermal energy within a traction battery of a vehicle, exchanging thermal energy between a fluid and air at a heat exchange module that is outside the traction battery, the air drawn to the heat exchange module from an area underneath the vehicle, the air dispensed from the heat exchange module to the area underneath the vehicle, the air dispensed from the heat exchange module without any of the air within the heat exchange module passing over any portion of the traction battery, wherein the heat exchange module is disposed within a cargo bed and the area is underneath a floor of the cargo bed.

* * * * *

UNITED STATES PATENT AND TRADEMARK OFFICE
CERTIFICATE OF CORRECTION

PATENT NO. : 11,007,900 B2
APPLICATION NO. : 16/124347
DATED : May 18, 2021
INVENTOR(S) : Andrew Charles Samyn, Stephen Pien and Erik Billimoria It is certified that error appears in the above-identified patent and that said Letters Patent is hereby corrected as shown below:

In the Claims

Claim 1, Column 6, Lines 40-41; replace "over traction battery" with --over the traction battery--

Claim 10, Column 7, Lines 14-15; replace "battery pack" with --traction battery--

Claim 16, Column 8, Line 6; replace "module disposed" with --module is disposed--

Claim 16, Column 8, Line 8; replace "liquid" with --fluid--

Claim 16, Column 8, Line 8-9; replace "to heat exchange module" with --to the heat exchange module--

Claim 17, Column 8, Line 22-23; replace "over traction battery" with --over the traction battery--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*